Patented July 20, 1926.

1,593,509

UNITED STATES PATENT OFFICE.

ALBERT EDWARD SMAILL, OF OTTAWA, ONTARIO, CANADA.

PROCESS FOR THE RECOVERY OF METAL AND OTHER VALUES IN ORES.

No Drawing. Application filed July 14, 1924, Serial No. 725,947, and in Canada January 3, 1924.

This invention relates to improvements in the recovery and separation of metals and other useful values in ores, concentrates, mattes, and other bodies, and in particular to sulphide ores, concentrates or mattes, the object being to recover, and make use of, all the possible values in the ore, concentrate, matte, or other body.

I have discovered that I can concentrate an ore, a matte, a concentrate, or other body, by smelting, or melting, under non-oxidizing conditions, in such a manner as to produce a slag of the gangue, or non-metalliferous portion and a comparatively heavy unstable matte of metal sulphides, in which are concentrated practically all the available metal and sulphur values of the ore, matte, concentrate, or other body and the flux, and, that this concentrated matte, when cool, is barely coherent and becomes self pulverized, or disintegrated, into a finely divided powder, on exposure to a natural, or moist, or moistened atmosphere, and, that the pulverized, or disintegrated matte is in a highly susceptible state which lends itself, readily, to many means of further separation, subdivision and concentration such as oxidation by roasting, or combustion, followed by chlorination and leaching with solvents such as water, brine, acid solutions and ammonium compound solutions, with novel and unprecedented results and leaving a residue suitable for many uses, such as in the production of steel, the choice and succession of processes, or operations depending on the final result desired.

This application is an extension of my application filed November 2nd, 1920, Serial No. 421,357 and also No. 445,021 filed February 14th, 1921, in that it relates to further discoveries in the production and use of a self pulverized matte, such as claimed in these applications. The applications mentioned concern the production of an alkaline, unstable matte of metal sulphide and a particular use of the matte after roasting. This application deals with the production of matte and the separation and useful recovery of all the constituents of the ore, or other body.

An ore containing iron, nickel and copper sulphides is now, usually, first roasted to oxidize the iron and reduce the sulphur content, followed by smelting and bessemerizing to produce a copper-nickel matte, which is later subjected to a series of operations for separation. These operations, practically, means the loss of nearly all the iron and sulphur values as well as the production of a useless slag. The aim of this invention is to make recovery of all these values usefully and, at the same time, simplify and make a more efficient separation and recovery of the copper and nickel values, as well as, the iron and sulphur, and also a useful slag.

This is accomplished, with such an ore, by first slagging off the gangue, or non-metalliferous portion, of the ore, with as little loss of the sulphur and metal values as possible and concentrating the metal and sulphur values in a matte, preferably alkaline, of metal sulphides, by melting, or smelting, the ore under non-oxidizing conditions, with a flux, preferably alkaline, to suit the character of the ore, such as fluorspar and lime and there may be added, with advantage, with the fluxes, a small percentage, about five percent or more, of an alkali metal compound such as sodium sulphate, sodium carbonate, etc. The molten bath should be withdrawn from the heat, tapped, or poured as soon as in a completely molten condition.

The slag, owing to comparative lightness, will rise to the top of the molten matte and may be tapped off separately, or the whole molten bath may be run into moulds, or settlers, in order to allow the slag to separate out and rise to the top of the matte, in which case, the separation may be made while still molten, or by fracture when cool.

The higher the sulphur and alkali content in the matte, the more unstable and, the more easily it becomes self pulverized, or disintegrated, on exposure and a matte with upwards of thirty percent sulphur will usually disintegrate easily and readily, while a matte with less than this percentage of sulphur is more coherent and usually requires more time and possibly a light crushing to completely disintegrate it. A deficiency in sulphur in the ore may be made up in the choice of flux employed in melting so as to produce an easily disintegrated matte.

The separated matte will readily break down, when cool, in a natural moist, or moistened atmosphere, or in water, into a finely divided powder, which may, if low in copper, be employed as indicated in my applications mentioned above, or, as contemplated in this invention, subjected to one, or more, methods of separation, concentration and recovery, in order to put all the possible values in a usable, or commercial form.

For example, if the pulverized matte is oxidized by roasting slowly and carefully, the material being kept in constant motion and at a temperature (the recording instruments being in the atmosphere immediately above the roasting matte) preferably not exceeding 450 degrees centigrade, to oxidize the iron and reduce the sulphur content, with the recovery of the sulphur from the gases, in any desirable manner, and this oxidizing roast followed by a chloridizing roast, the chloride being preferably common salt, upwards of five percent being usually required, and the temperature, preferably at, or near, 425 deg. centigrade, it will be found that upwards of 95% of the copper and upwards of 75% of the nickel values with less than one percent of the iron and the precious metal values, if any, are now in a soluble state, capable of being leached out with solvents such as water, brine, weak acid and ammonium compound solutions, leaving as a residue, a finely divided powder of metal oxide consisting principally of iron with a small percentage of nickel.

It will be apparent that roasting at the temperature above indicated the sulphur will not be completely removed from the pulverized matte, as the copper and nickel remain in sulphurate forms at this temperature. The chloridizing roast completes the desulphurization of the matte.

While the chloridizing roast is proceeding, considerable quantities of gases are evolved and, if these are passed through, or washed with water, it will be found that the acid solutions thereby obtained, form the base for an effective leach solution for the subsequent leaching operation. Such a solution is particularly effective where precious metal values are to be leached.

The results noted are novel; the usual result of roasting, chloridizing, and leaching an ore containing copper, nickel and iron sulphide is to leach out the copper. The results obtained by leaching a roasted matte, produced as stated above, are equally novel although not so effective, upwards of 90% of the copper and upwards of 50% of the nickel, only may be expected in the leach, but for some purposes this will be quite satisfactory, especially where precious metals are not involved.

The effectiveness of the leach is largely governed by the completeness of the oxidizing and chloridizing roasts and practically complete extraction of the copper should be effected. This has been accomplished by first leaching with a 5% ammonium sulphate solution followed by a 10% sulphuric acid leach.

It is desirable that the oxidization of the iron, in particular, be as complete as possible, without raising the temperature above the limit indicated, in order to have it in as insoluble state as possible so that it will remain with the residue on leaching.

Chloridization is assisted by the presence of moisture and this can best be effected by adding about 10% of water to a batch, along with the salt, before roasting. It is unnecessary to keep the batch in motion during the chloridizing roast and it is advisable to leach immediately after roasting, while still hot, as more effective leaching takes place.

The separation and recovery of the leached copper and nickel, as well as precious metals, if any, may be effected by following any well known means in hydro-metallurgy, such as cementation of the copper, followed by electro-deposition of the nickel, or both may be electro-deposited as the solution is in a suitable state, if the leach has been made as stated above. If the leach liquid is concentrated, the copper, nickel and iron salts will crystallize out and a satisfactory separation may be effected by re-crystallizing a supersaturated solution, with temperature control.

The leached residues are in a finely divided oxide powder, usually red in colour, consisting, principally of iron oxide with a small percentage of nickel. The percentage of nickel in the residue will enhance its value, if used in the production of nickel steel of 3½% nickel, for instance. A variety of uses will be found for the oxide residue such as in the production of iron, or steel, of exceptional purity and quality, also in the production of sponge iron and pigments. They may also form a base for a scavenging alloy, if treated as stated in my applications mentioned above, by re-roasting with upwards of 5% of a sodium compound, such as sodium carbonate.

The application of this method of recovery is not confined to the ore cited but is capable of being used, with advantage, with any ore, matte or other body, carrying metal values capable of being chloridized, or converted into a soluble state, by the whole, or part of, the above treatment and carrying sufficient sulphur to produce when melted, under non-oxidizing conditions, with suitable flux, a concentrated matte, preferably alkaline and hygroscopic, of easily disintegrated metal sulphide, which may be treated after the manner stated above, or otherwise, to take advantage of the highly susceptible state the matte, so produced, is in, to separate and recover the constituent values.

It may be applied, for example to an ore carrying iron and gold sulphide. Another example is that of converting a pyrite into a pigment with the recovery of any values such as copper.

The fresh disintegrated matte is not magnetic but as oxidization progresses it becomes more so and an aged matte will be found to be only partially magnetic, depending on the extent of the gradual oxidization that has taken place. A completely, or dead roasted, matte is completely magnetic.

The fresh unstable matte breaks down immediately in water, with the evolution of sulphuretted hydrogen and a considerable portion goes into a ferrous iron slime, which may be separated out by tabling and for some purposes this will be of value. This action is almost negligible with an aged matte, due to the gradual oxidization that has taken place.

Advantage may be taken of the extremely fine subdivision of the self pulverized matte and the oxidization take the form of combustion, with the pulverized matte forming the whole, or part of, the fuel of the flame, using a pulverized fuel burner. The flame will be directed into a heated combustion chamber, of suitable form, with heated air supply, to maintain oxidizing conditions. The oxidized particles will fall to the bottom of the combustion chamber, from whence they may be continuously withdrawn while the heated gases will pass on and may be treated in a variety of ways to recover any volatilized metal values and the sulphur, depending on the final result desired, for example they may be passed through a wash tower, for the production of acid.

The example cited shows that the recovery of the metal values in such an ore is simplified and economy of heat and material is effected by first concentrating, in an easily disintegrated matte of metal sulphide, without material loss, all the available metal and sulphur values; the number of meltings and other operations reduced, and all the recoveries of the values are attended with little loss and all are recovered, with expedition, in useful forms. The slag being basic is of economic value.

It is to be noted that the preliminary production of the pulverized matte could, with advantage, take place at, or near, the mine and the subsequent treatment of the pulverized matte at some other and more convenient point where the by-products could be put to use, directly, with advantage.

The application of the above methods of separation is not confined to alkaline pulverized matte produced in the above manner only, but is equally applicable to all pulverized mattes, however produced.

As many changes could be made in the above construction and many apparently different embodiments of my invention within the scope of the claims constructed, without departing from the spirit, or scope, thereof, it is intended that all matter contained in the accompanying specification shall be interpreted as illustrative and not in a limiting sense.

What I claim as my invention is:—

1. In a process of treating material containing sulphur and metal values, the step which consists in melting the said material with an alkaline flux under non-oxidizing conditions, removing the slag so formed and recovering in a self-disintegrating matte, without substantial loss, the sulphur and metal values.

2. A process of treating sulphide ore which consists in melting said ore with an alkaline flux under non-oxidizing conditions, removing the slag so formed and disintegrating the resulting matte by exposing the same to a moist atmosphere.

3. A process of treating sulphur bearing ore which consists in smelting said ore with an alkaline flux under non-oxidizing conditions to produce a self-disintegrating matte, without substantial loss of sulphur or metal.

4. A process of treating sulphur bearing ore which consists in smelting said ore with an alkaline flux to produce a self-disintegrating matte, without substantial loss of sulphur or metal, permitting the matte to disintegrate and roasting said matte in disintegrated form.

5. A process of treating matte or other body containing sulphur and metal values, which consists in smelting the material under non-oxidizing conditions with an alkaline flux, separating the matte and slag so formed, pulverizing the matte by exposure to a moist atmosphere, roasting the pulverized matte, chloridizing the roasted matte with a suitable chloride and leaching the chloridized product to remove the chloridized metals and leave a residue of metal oxide.

6. A process of concentrating the sulphur and metal values of an ore, matte or other body containing the same which consists in smelting said material with an alkaline flux under non-oxidizing conditions to form a hygroscopic matte containing substantially all the metal values and a slag containing the gangue material.

7. A process of treating an ore, concentrate or matte containing nickel-copper-iron-sulphide which consists in smelting said material with an alkaline flux under non-oxidizing conditions, separating the slag and matte so formed, permitting the matte to disintegrate, roasting said matte in disintegrated form at a temperature of about 450° C. chloridizing the roasted product and leaching the resulting product to remove substantially all the soluble nickel and copper and leave a residue of metal oxide consisting principally of iron.

8. A process of producing metal oxide which consists in concentrating the metal and sulphur values of an ore, matte or other body into a hygroscopic self-disintegrating matte by smelting said material with an alkaline flux under non-oxidizing conditions, allowing the matte to disintegrate and roasting said matte in disintegrated form as herein described.

9. A process as defined in claim 4 wherein the roasting is effected by projecting the pulverized matte into a combustion chamber with only sufficient extraneous fuel to maintain the temperature required to oxidize the sulphur of the matte.

Ottawa, Canada, July 10th, 1924.

A. E. SMAILL.